(12) United States Patent
Szymanski (10) Patent No.: US 11,135,889 B2
(45) Date of Patent: Oct. 5, 2021

(54) LATCH ASSEMBLY FOR RAISING AND LOWERING THE HEIGHT OF A VEHICLE

(71) Applicant: BeijingWest Industries Co., Ltd., Beijing (CN)

(72) Inventor: Jerzy Piotr Szymanski, Villeneuve Sablons (FR)

(73) Assignee: BEIJINGWEST INDUSTRIES CO., LTD., Beijing (CN)

(*) Notice: Subject to any disclaimer, the term of this patent is extended or adjusted under 35 U.S.C. 154(b) by 262 days.

(21) Appl. No.: 16/384,504

(22) Filed: Apr. 15, 2019

(65) Prior Publication Data

US 2019/0359021 A1  Nov. 28, 2019

Related U.S. Application Data

(60) Provisional application No. 62/674,612, filed on May 22, 2018.

(51) Int. Cl.
*B60G 17/005* (2006.01)
(52) U.S. Cl.
CPC ........ *B60G 17/005* (2013.01); *B60G 2500/30* (2013.01)
(58) Field of Classification Search
CPC .. B60G 17/005; B60G 2500/30; F16F 9/0245
USPC ...................................................... 188/300
See application file for complete search history.

(56) References Cited

U.S. PATENT DOCUMENTS

| 6,056,333 A | 5/2000 | Wach |
| 10,766,328 B2* | 9/2020 | Woehler ............... B60G 15/067 |
| 2015/0137464 A1* | 5/2015 | Kasian ................... B60G 17/00 280/6.157 |

(Continued)

FOREIGN PATENT DOCUMENTS

| CN | 2012072784 A | 4/2012 |
| CN | 106799945 A | 6/2017 |

(Continued)

OTHER PUBLICATIONS

Extended European Search Report dated Dec. 17, 2019 for counterpart European patent application No. 19173773.3.

(Continued)

*Primary Examiner* — Melanie Torres Williams
(74) *Attorney, Agent, or Firm* — William H. Honaker; Dickinson Wright PLLC (57) ABSTRACT

A latching assembly includes a lift housing extending along a center axis between a first and a second opened ends and defining a chamber extending therebetween. A support tube is disposed in the chamber and extends between a first and a second end. A moving member is disposed between the support tube and the lift housing for moving the lift housing between an extended position and a lowered position. The moving member includes an inner ring and an outer ring. The inner ring extends about the support tube. The outer ring is attached to the lift housing for translating an axial movement of the support tube into a rotational movement. A plurality of engagement members located between the inner ring and the outer ring for moving the inner ring and said outer ring axially along the center axis from the extended position to the lowered position.

20 Claims, 6 Drawing Sheets

(56) References Cited

U.S. PATENT DOCUMENTS

| | | | | |
|---|---|---|---|---|
| 2016/0193890 A1* | 7/2016 | Dobre | ............ | B60G 17/021 |
| | | | | 280/5.514 |
| 2017/0028805 A1* | 2/2017 | Krehmer | ............ | B60G 11/16 |
| 2017/0197484 A1* | 7/2017 | Mersmann | ............ | B60G 15/07 |
| 2018/0306243 A1 | 10/2018 | Iino et al. | | |

FOREIGN PATENT DOCUMENTS

| | | | |
|---|---|---|---|
| CN | 106965639 A | | 7/2017 |
| CN | 107757286 A | | 3/2018 |
| DE | 102014215420 A1 | | 2/2015 |
| EP | 1041307 A1 | | 10/2000 |
| JP | 50054775 A | * | 9/1974 |
| JP | 1975054775 A | | 5/1975 |
| JP | 03186629 A | * | 8/1991 |
| JP | 5572504 B2 | | 8/2014 |
| JP | 2016530154 A | | 9/2016 |
| WO | 2009017057 A1 | | 2/2009 |

OTHER PUBLICATIONS

First Office Action dated Aug. 25, 2020 for counterpart European patent application No. 19173773.3.

First Office Action issued for corresponding Japanese Patent Application 2019-095621 dated Apr. 21, 2020.

First Office Action and search report dated Jun. 2, 2020 for counterpart Chinese patent application No. 201910339055.8, along with machine EN translation downloaded from EPO.

\* cited by examiner

LATCH ASSEMBLY FOR RAISING AND LOWERING THE HEIGHT OF A VEHICLE

CROSS-REFERENCE TO RELATED APPLICATIONS

This application claims the benefit of U.S. Provisional Application Patent Ser. No. 62/674,612, filed May 22, 2018, the entire disclosure of which is hereby incorporated herein by reference.

BACKGROUND OF THE INVENTION

1. Field of the Invention

The present invention generally relates to a latch assembly for raising and lowering the height of a vehicle.

2. Description of the Prior Art

Devices for adjusting the height of a vehicle body are known. The devices may be provided in the suspension struts of motor vehicles, in particular, for increasing the ground clearance of motor vehicles or lowering the body for flat road surfaces. Typically, such a device includes a lift housing disposed on a center axis defining a chamber. A support tube is disposed in the chamber with the lift housing being movable along the center axis relative to the support tube. The movement of the lift housing is typically conducted using a hydraulic actuator. However, if the lift housing needs to be held in an extended position to increase the height of a vehicle, a constant hydraulic pressure is required. Accordingly, the hydraulic pump needs to work/restart periodically due to unavoidable internal leaks. Solenoid activated mechanisms, e.g. a pneumatic suspension, are also available for this type of application. However, the solenoid activated mechanisms require electric power input for the locking/unlocking of the solenoid valve which is slow in response time and has a higher energy consumption.

One such a device is disclosed in U.S. Pat. No. 9,707,819. The device includes a lift housing extending along a center axis between a first opened end and a second opened end and defining a chamber extending therebetween. A support tube is slidably disposed in the chamber and extends about the center axis between a first end and a second end. A moving member is disposed between the support tube and the lift housing for moving the lift housing between an extended position and a lowered position.

SUMMARY OF THE INVENTION

The invention provides for a latch assembly that efficiently raises and lowers the height of the vehicle thereby improving vehicle energy consumption due to reduced air drag. The present invention also maintains the vehicle being in the raised position without additional energy consumption. In addition, the present invention prevents unintentional movements of the rotating latch assembly from the extended position to the lowered position. Further, the present invention provides for a latch assembly that has a simple design and a low cost in production.

It is one aspect of the present invention to provide a latching assembly. The latching assembly includes a lift housing extending along a center axis between a first opened end and a second opened end and defining a chamber extending therebetween. A support tube is slidably disposed in the chamber and extends about the center axis between a first end and a second end. A moving member is disposed between the support tube and the lift housing for moving the lift housing between an extended position and a lowered position. The moving member includes an inner ring and an outer ring. The inner ring extends about to the support tube. The outer ring is attached to the lift housing for translating an axial movement of the support tube into a rotational movement to secure the lift housing in the extended position and allow the lift housing to move from the extended position to the lowered position. A plurality of engagement members located between the inner ring and the outer ring for moving the inner ring and the outer ring axially along the center axis between the extended position and the lowered position. The engagement members also maintain the lift housing in the extended position without additional energy consumption and prevents unintentional movements of the rotating latch assembly from the extended position to the lowered position.

It is another aspect of the present invention to provide a latching assembly for raising and lowering vehicle height. The latching assembly includes a lift housing extending along a center axis between a first opened end and a second opened end and defining a chamber extending therebetween. A support tube is slidably disposed in the chamber and extends about the center axis between a first end and a second end. A moving member is disposed between the support tube and the lift housing for moving the lift housing between an extended position and a lowered position. The moving member includes an inner ring and an outer ring. The inner ring extends about the support tube. The outer ring is attached to the lift housing for translating an axial movement of the support tube into a rotational movement to secure the lift housing in the extended position and allow the lift housing to move from the extended position to the lowered position. A bearing is disposed between an interior surface of the inner ring and the support tube with the bearing being rotatable about the support tube. The bearing is attached to the inner ring to allow the inner ring to rotate about the support tube in response to an axial movement of the support tube. A plurality of engagement members located between the inner ring and the outer ring for moving the inner ring and the outer ring axially along the center axis between the extended position and the lowered position. The engagement members also maintain the lift housing in the extended position without additional without additional energy consumption and prevents unintentional movements of the rotating latch assembly from the extended position to the lowered position

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
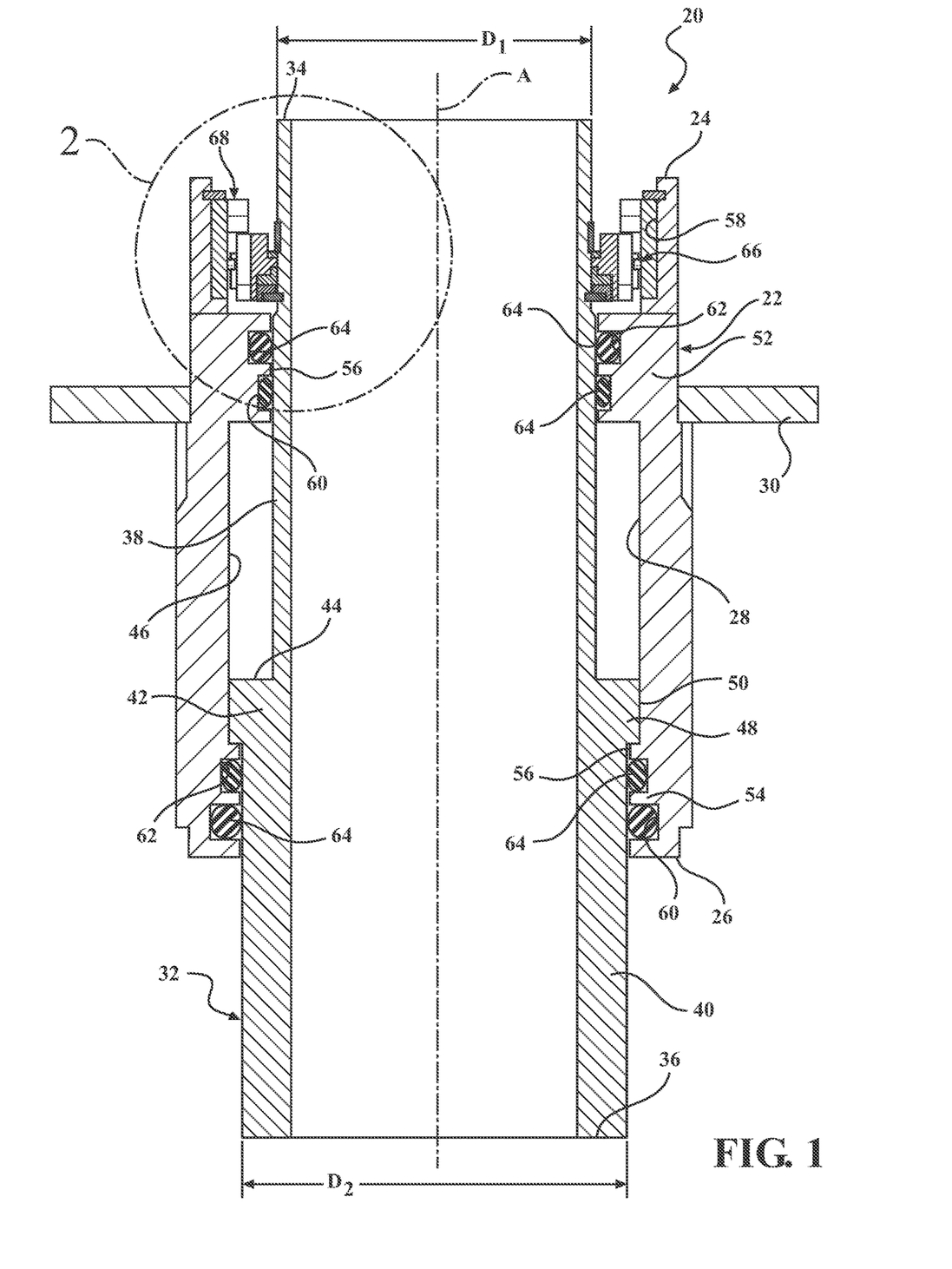
FIG. 1 is a cross-sectional perspective view of the latch assembly.

Referring to the Figures, wherein like numerals indicate corresponding parts throughout the several views, a latch assembly 20 constructed in accordance with one embodiment of the present invention is generally shown in FIG. 1. Typically, the latch assembly 20 is used in a vehicle for raising and lowering the height of the vehicle.

Referring to FIG. 1, the latch assembly 20 includes a lift housing 22, having a generally tubular shape, disposed annularly about and extending along a center axis A between a first opened end 24 and a second opened end 26. The lift housing 22 defines a chamber 28 extending between the first opened end 24 and the second opened end 26. A lift spring seat 30 is disposed about the first opened end 24, attached to the lift housing 22, and extends annularly about the center axis A. A support tube 32, having a generally cylindrical shape, slidably disposed in the chamber 28. The support tube 32 is disposed in a concentric relationship with the lift housing 22 and extends about the center axis A between a first end 34 and a second end 36. The first end 34 of the support tube 32 is located outside of the chamber 28 and axially spaced from the first opened end 24. The second end 36 of the support tube 32 is located outside of the chamber 28 and axially spaced from the second opened end 26. It should be appreciated that in one embodiment of the present invention, the lift housing 22 can be connected to an actuator, e.g. a hydraulic actuator, for moving the lift housing 22 axially along the support tube 32.

The support tube 32 includes a first portion 38 and a second portion 40. The first portion 38 of the support tube 32 is disposed adjacent to the first end 34 and extends about the center axis A defining a first diameter $D_1$. The second portion 40 of the support tube 32, spaced from the first portion 38, disposed adjacent to the second end 36 extending about the center axis A to define a second diameter $D_2$ with the second diameter $D_2$ being greater than the first diameter $D_1$. An intermediate portion 42 extends radially outwardly from the first portion 38, in a perpendicular relationship with the center axis A, to the second portion 40 connecting the first portion 38 with the second portion 40 presenting a shoulder 44 extending along the intermediate portion 42. The intermediate portion 42, the lift housing 22, and the first portion 38 of the support tube 32 define a compartment 46 extending between the shoulder 44, the first portion 38 of the support tube 32, and the lift housing 22.

The intermediate portion 42 includes a projection 48 extending radially outwardly from the intermediate portion 42, perpendicular to the center axis A, to a distal end 50 for engaging the lift housing 22. A pair of protrusions 52, 54 include a first protrusion 52 and a second protrusion 54, spaced from one another, is disposed in the chamber 28 and extending radially inwardly from the lift housing 22 toward the center axis A to a terminal end 56 abutting the support tube 32 for engaging the projection 48 to limit axial movement of the support tube 32. The first protrusion 52 is located axially spaced from the first opened end 24 and extends radially inwardly toward the center axis A to engage the support tube 32 and also defining a pocket 58 extending between the first protrusion 52, the support tube 32, and the lift housing 22. The second protrusion 54 is located at the second end and extends radially inwardly toward the center axis A to engage the support tube 32. Each of the protrusions 52, 54 defines at least one groove 60, 62 including a first groove 60 and a second groove 62, axially spaced from one another, and extending annularly about the support tube 32 for receiving an O-ring 64 and provide a seal engagement with the support tube 32 to prevent dust and other particles from entering said chamber 28.

A moving member 66, 68 is disposed between the support tube 32 and the lift housing 22 for moving the lift housing 22 between an extended position and a lowered position to adjust the height of the vehicle. The moving member 66, 68 also maintains the lift housing 22 in the extended position as the lift housing 22 moves from the lowered position to the extended position. When in the extended position, the second protrusion 54 abuts with the projection 48 and the first protrusion 52 is spaced from the projection 48 to increase the height of the vehicle. When in the lowered position, the first protrusion 52 abuts the projection 48 and the second protrusion 54 is axially spaced from the projection 48 to reduce the height of the vehicle.

As best illustrated in FIGS. 2-5, the moving member 66, 68 includes an inner ring 66 and an outer ring 68. The inner ring 66, having a generally cylindrical shape, extends about the support tube 32. The outer ring 68 is attached to the lift housing 22. The inner ring 66 and the outer ring 68 engage one another for translating an axial movement of the support tube 32 into a rotational movement to allow the lift housing 22 to move between the extended position and the lowered position and maintain the lift housing 22 in the extended position.

Figure 2:
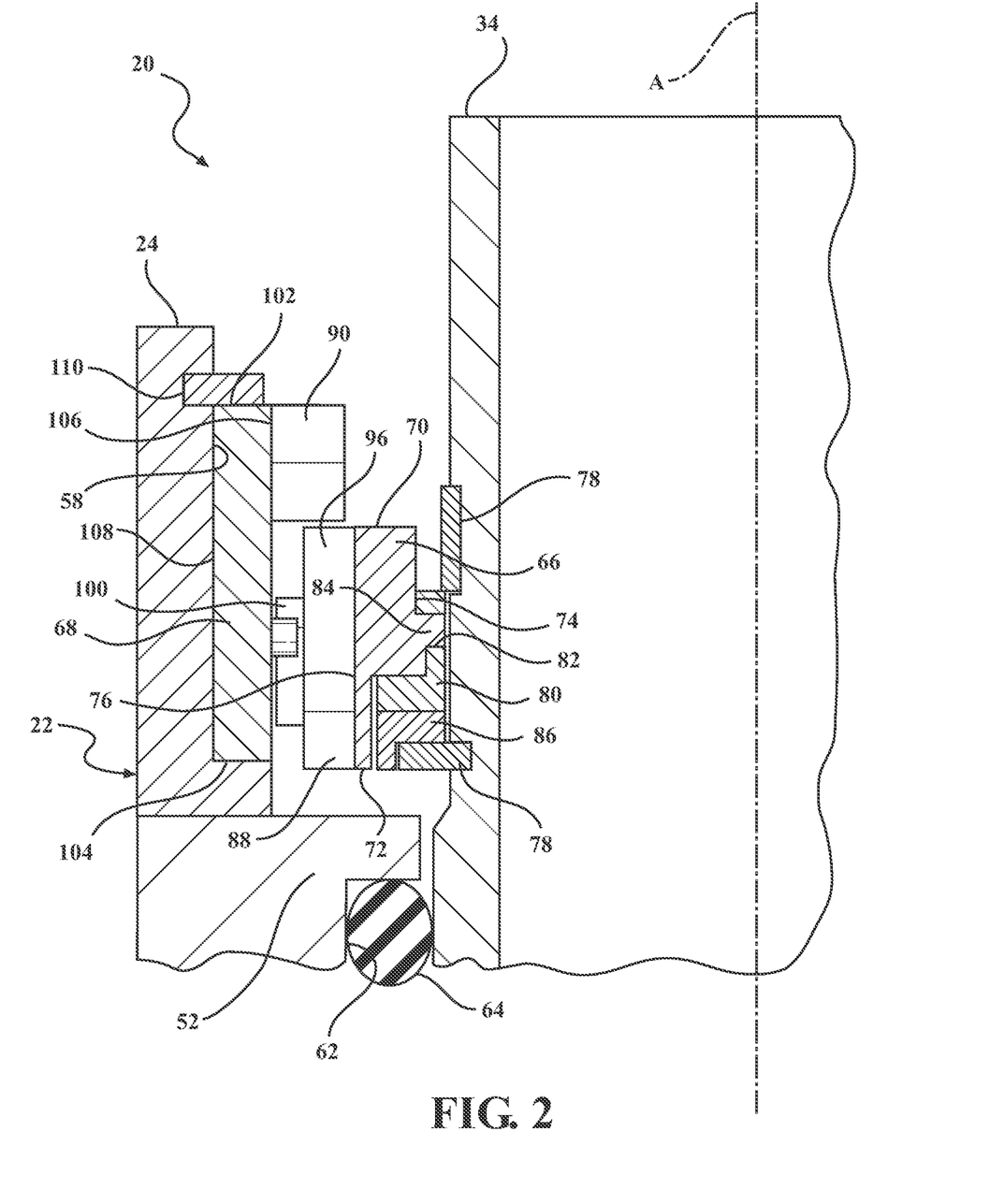
FIG. 2 is an enlarged cross-sectional view of the moving member of the latch assembly.

As best shown in FIG. 2, the inner ring 66 is disposed in the pocket 58 and extends between an upper end 70 and a lower end 72. The lower end 72 of the inner ring 66 is disposed adjacent to the first protrusion 52. The inner ring 66 has an interior surface 74 and an exterior surface 76, spaced from one another, extending about the center axis A between the lower end 72 and the upper end 70 with the interior surface 74 being disposed in abutment relationship with the support tube 32. A pair of snap rings 78, spaced from one another, and attached to the support tube 32 with one of the snap rings 78 being disposed adjacent to the lower end 72 of the inner ring 66 and another one of the snap rings 78 being disposed adjacent to the upper end 70 of the inner ring 66 to secure the inner ring 66 to the support tube 32. In other words, the snap rings 78 sandwich the inner ring 66 therebetween to secure the inner ring 66 to the support tube 32.

A bearing 80 is disposed between the interior surface 74 of the inner ring 66 and the support tube 32. The bearing 80 is rotatable about the support tube 32 and is attached to the inner ring 66 to allow the inner ring 66 to rotate about the support tube 32 in response to an axial movement of the support tube 32. The bearing 80 defines at least one orifice 82. In one embodiment of the present, the at least one orifice 82 can be a recess 82 extending about the bearing 80. A nub 84 extends outwardly from the interior surface 74 of the inner ring 66 and radially inwardly toward the center axis A to connect the inner ring 66 with the bearing 80. In one embodiment of the present invention, the nub 84 can extend annularly about the center axis A and the inner ring 66 for engaging the recess 82 of the bearing 80. A support ring 86 is disposed between the bearing 80 and one of the snap rings 78, adjacent to the lower end 72 of the inner ring 66 for receiving the bearing 80 and provide support to the bearing 80.

Figure 3:
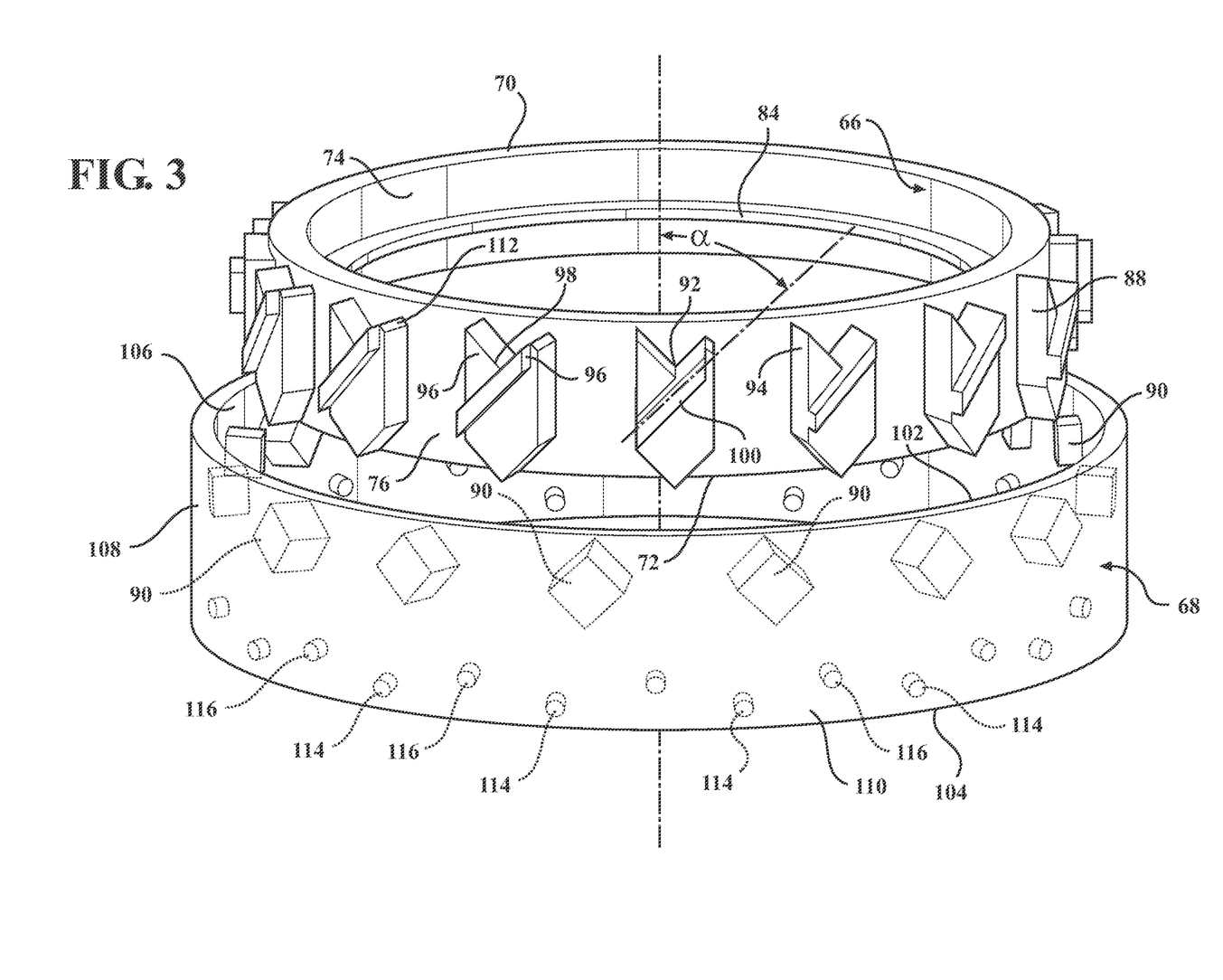
FIG. 3 is an exploded perspective view of the moving member of the latch assembly.
Figure 4:
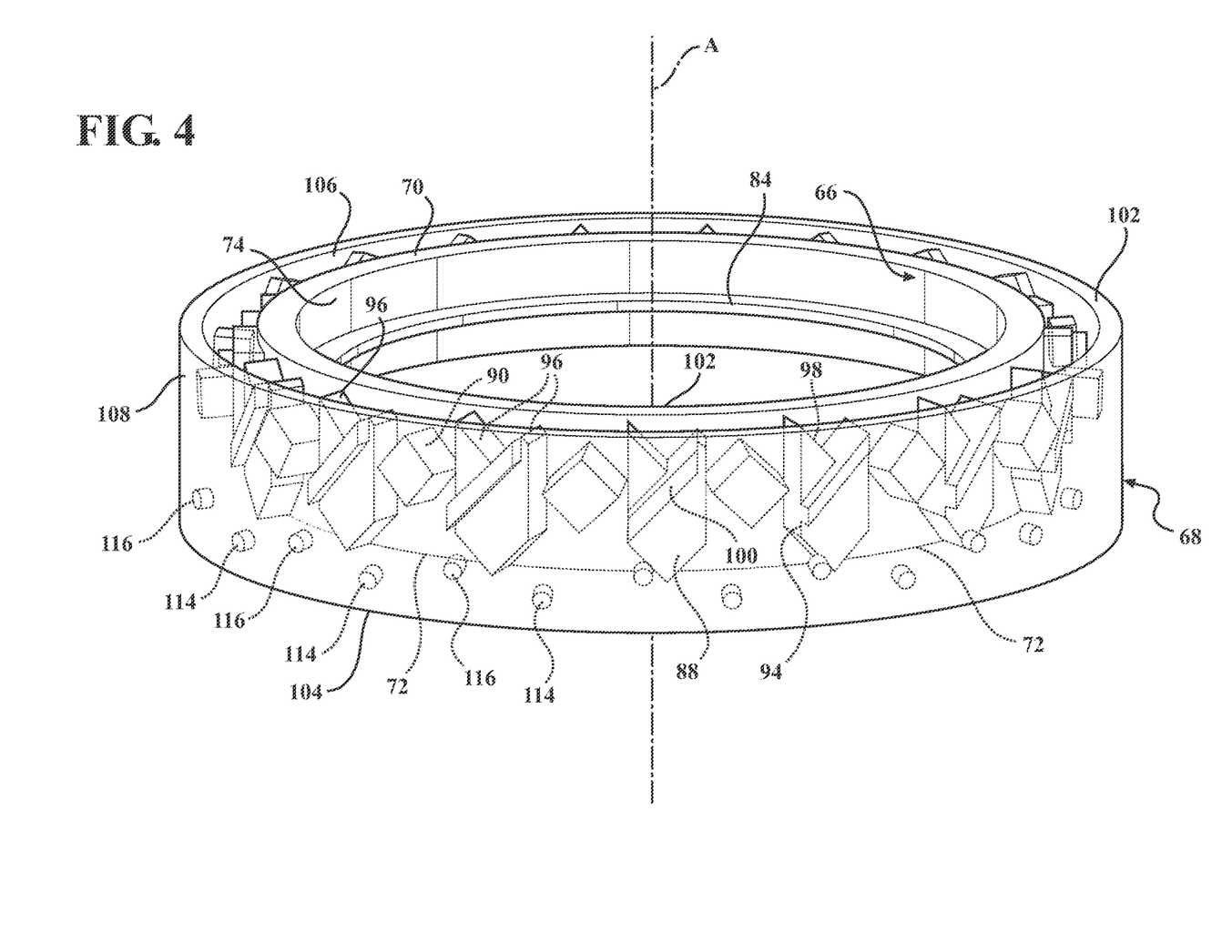
FIG. 4 is a perspective view of the moving member of the latch assembly in the lowered position.
Figure 5:
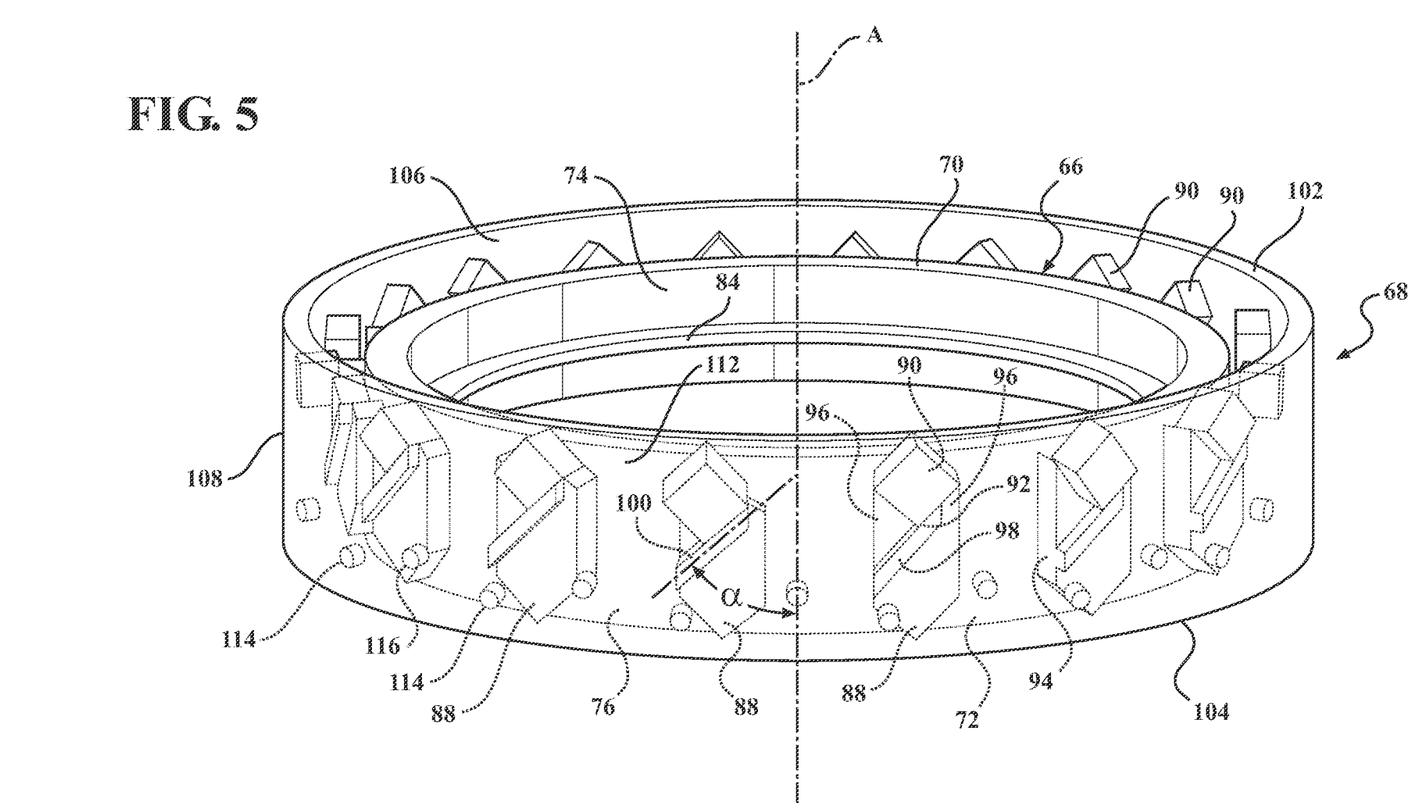
FIG. 5 is a perspective view of the moving member of the latch assembly in the extended position.

As illustrated in FIGS. 3-5, a plurality of engagement members 88, 90 located between the inner ring 66 and the outer ring 68 for moving the inner ring 66 and the outer ring 68 axially along the center axis A between the extended position and the lowered position. The engagement members 88, 90 include a plurality of inner ring teeth 88 extending radially outwardly from the exterior surface 76 of the inner ring 66, circumferentially spaced from one another and along the center axis A, from the lower end 72 of the inner ring 66 to an inner ring teeth end 92 spaced from the upper end 70 of the inner ring 66 for engaging the outer ring 68. The exterior surface 76 of the inner ring teeth 88 also defines a plurality of slots 94, circumferentially spaced from one another, extending between the inner ring teeth 88. A pair of arms 96 extends outwardly from the inner ring teeth end 92, orthogonal to one another, and tapering toward the upper end 70. As best shown in FIG. 4, one of the arms 96 is longer than another one of the arms 96 to define a cavity 98, having a generally V-shape, extending between the arms 96. Each of the inner ring teeth 92 includes a cam 100 extending radially outwardly from the inner ring teeth 90, diagonally across the inner ring teeth 90, at an oblique angle α relative to the center axis A.

Referring back to in FIG. 3, the outer ring 68, having a generally circular shape, is disposed in the pocket 58 and attached to the lift housing 22 for engaging the inner ring 66. The outer ring 68 extends between a top end 102 and a bottom end 104 and having an inner surface 106 and an outer surface 108 extending about the center axis A. The outer surface 108 of the outer ring 68 is attached to the lift housing 22. A retainer ring 110, having a generally circular shape, is disposed adjacent to the top end 102 of the outer ring 68, attached to the lifting housing 22, and extends about the center axis A to secure the outer ring 68 to the lift housing 22.

The engagement members 88, 90 include a plurality of outer ring teeth 90, each having a diamond shape, disposed adjacent to the top end 102 of the outer ring 68, circumferentially spaced from one another, extending outwardly from the inner surface 106 of the outer ring 68 for sliding along the arms 86 and engaging the cavity 98 of the inner ring teeth 88 to secure the lift housing 22 in the extended position. The another one of the arms 86 defines a slanted surface 112 for receiving the outer ring teeth 90 and allows the lift housing 22 to be moved from the extended position to the lowered position. A plurality of pins 114, 116 extends radially inwardly toward the center axis A for slidable engagement with the cam 98 to rotate the inner ring 66 about the support tube 32 and allow the lift housing 22 to move between the extended position and the lowered position. The plurality of pins 114, 116 including a first set of pins 114 and a second set of pins 116. The first set of pins 114, circumferentially spaced from one another, located adjacent to the bottom end 104 of the outer ring teeth 90 and extending radially inwardly toward the center axis A. The second set of pins 116 located radially and circumferentially spaced from the first set of pins 114 for engaging the cam 100 of the inner ring 66.

Figure 6:
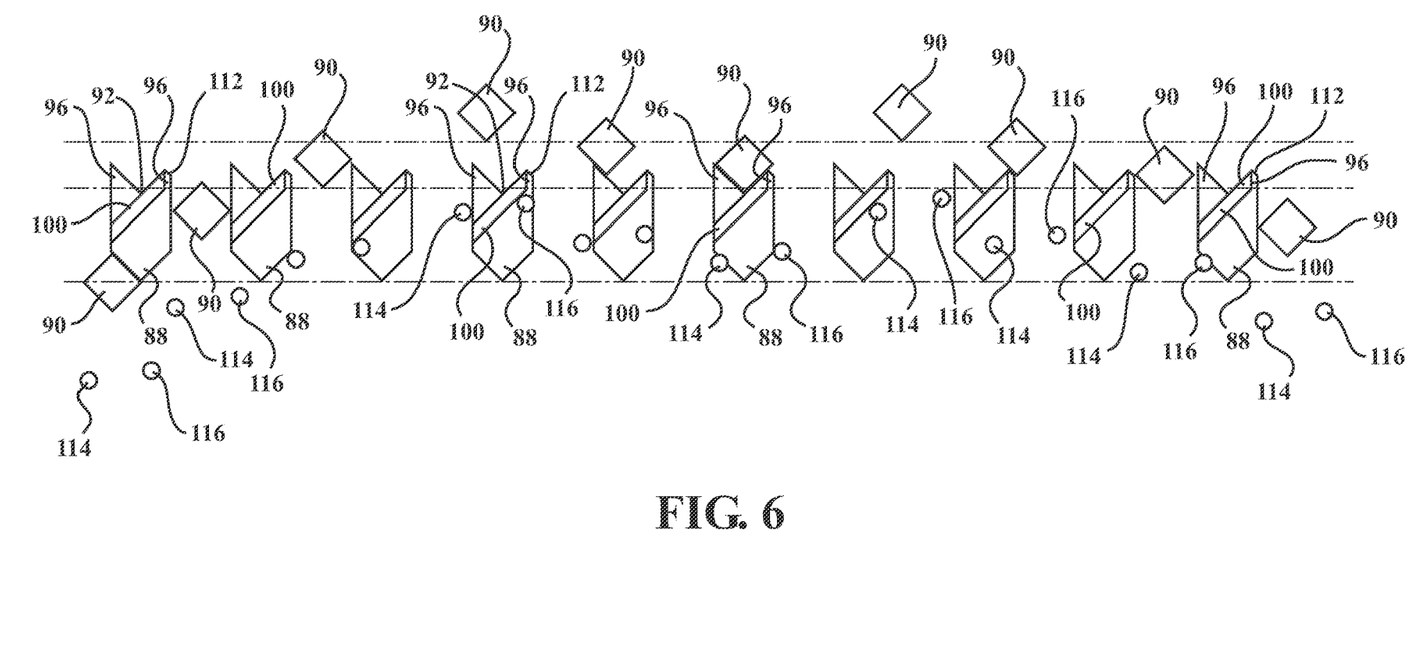
FIG. 6 is schematic view showing the movement of the inner ring and the outer ring of the moving member between the extended position and the lowered position.

In operation, also best illustrated in FIG. 6, initially, the lift housing 22 is in the lowered position. While in the lowered position, the outer ring teeth 90 are disposed adjacent to the lower end 72 of the inner ring 66 and axially below the inner ring teeth 88. Alternatively, while in the lowered position, the outer ring teeth 90 can be received in the slots 94 between the inner ring teeth 88. To move from the lowered position to the extended position, the hydraulic actuator provides an axial movement to the lift housing 22 causing the lift housing 22 to move axially along the center axis A and the support tube 32. As the lift housing 22 moves axially along the support tube 32, the outer ring teeth 90 slide in the slots 94 toward the upper end 70 of the inner ring 66. When the outer ring teeth 90 slide past the arms 96 of the inner ring teeth 88, e.g. at a maximum height, the second set of pins 116 engages the cam 100 and slides along the cam 100. In response to the sliding movement of the second set of pins 116 along the cam 100, the cam 100 translates the axial movement of the lift housing 22 into a rotational movement causing the inner ring 66 to rotate about the support tube 32. As the outer ring 68 is lowered toward the inner ring 58, i.e. the hydraulic actuator stops providing the axial movement to the lift housing 22, the outer ring teeth 90 slides along the arms 96 to further rotate the inner ring 66 and aligns the outer ring teeth 90 with the cavity 98 to allow the cavity 98 to receive the outer ring teeth 90 and define the extended position. Based on the engagement between the outer ring teeth 90 and the inner ring teeth 88, the outer ring teeth 90 is rested in the cavity 98 of the inner ring teeth 88 thereby maintaining the lift housing 22 in the extended position without any additional force input provided by the hydraulic actuator. It should be appreciated that, as the outer ring teeth 90 is moved beyond the inner ring teeth 88, additional axial movement of the lift housing 22 may be possible through the implementation and arrangement additional ribs on the inner surface 106 of the outer ring 68.

To move from the extended position to the lowered position, the hydraulic actuator provides another axial movement to the lift housing 22 causing the lift housing 22 to move axially away from the support tube 32. In response to the axial movement of the lift housing 22, the outer ring 68 moves axially away from the inner ring 66. As a result of this axial movement, the outer ring teeth 90 move axially away from the cavity 98 of the inner ring teeth 88 and the first set of pins 114 engages the cam 100 and slides along the cam 100. In response to the sliding movement of the first set of pins 114 along the cam 100, the axial movement of the lift housing 22 is translated into a rotational movement causing the inner ring 66 to rotate about the support tube 32. As the outer ring 68 is lowered toward the inner ring 66, the outer ring teeth 90 slides along the slanted surface 112 of one of the arm 96 to further rotate the inner ring 66 and aligns the outer ring teeth 90 with the slots 94 between the inner ring teeth 88 to allow the slots 94 to receive the outer ring teeth 90 and define the lowered position.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A latching assembly comprising:
a lift housing extending along a center axis between a first opened end and a second opened end and defining a chamber extending therebetween;
a support tube slidably disposed in said chamber extending about said center axis between a first end and a second end;
a moving member disposed between said support tube and said lift housing for moving said lift housing between an extended position and a lowered position;
said moving member including an inner ring and an outer ring with said inner ring extending about said support tube and said outer ring being attached to said lift housing for translating an axial movement of said support tube into a rotational movement to secure said lift housing in said extended position and allow said lift housing to move from said extended position to said lowered position; and a plurality of engagement members located between said inner ring and said outer ring for moving said inner ring and said outer ring axially along said center axis between said extended position and said lowered position, wherein said engagement members including a plurality of inner ring teeth extending radially outwardly from an exterior surface of said inner ring, circumferentially spaced from one another, and along said center axis to an inner ring teeth end for engaging said outer ring, wherein said latching assembly further includes a pair of arms extending outwardly from said inner ring teeth end orthogonal to one another and tapering toward an upper end with one of said pair of arms being longer than another one of said pair of arms to define a cavity having a V-shape extending between said pair of arms.

2. The latching assembly as set forth in claim 1 wherein each of said inner ring teeth including a cam extending radially outwardly from said inner ring teeth and diagonally across said inner ring teeth at an oblique angle relative to said center axis.

3. The latching assembly as set forth in claim 1 wherein said engagement members further including a plurality of outer ring teeth, circumferentially spaced from one another, extending outwardly from an inner surface of said outer ring for engaging said inner ring teeth.

4. The latching assembly as set forth in claim 3 wherein each of said outer ring teeth has a diamond shape for sliding along said one of said pair of arms and engaging said cavity of said inner ring teeth to secure said lift housing in said extended position.

5. The latching assembly as set forth in claim 4 wherein said another one of said pair of arms defines a slanted surface for receiving said outer ring teeth and allows said lift housing to be moved from said extended position to said lowered position.

6. The latching assembly as set forth in claim 2 further including a plurality of pins extending radially inwardly toward said center axis for slidable engagement with said cam to rotate said inner ring about said support tube and allow said lift housing to move between said extended position and said lowered position.

7. The latching assembly as set forth in claim 6 wherein said plurality of pins includes a first set of pins, circumferentially spaced from one another, for engaging said cam.

8. The latching assembly as set forth in claim 7 wherein said plurality of pins includes a second set of pins located radially and circumferentially spaced from said first set of pins for engaging said cam of said inner ring.

9. The latching assembly as set forth in claim 1 further including a bearing disposed between an interior surface of said inner ring and said support tube with said bearing being rotatable about said support tube and attached to said inner ring to allow said inner ring to rotate about said support tube in response to an axial movement of said support tube.

10. The latching assembly as set forth in claim 9 further including a pair of snap rings, spaced from one another, and attached to said support tube sandwiching said inner ring between said snap rings to secure said inner ring to said support tube.

11. The latching assembly as set forth in claim 10 further including a support ring disposed between said bearing and one of said snap rings for receiving said bearing.

12. The latching assembly as set forth claim 9 wherein said bearing defines at least one orifice.

13. The latching assembly as set forth in claim 12 further including a nub extending outwardly from an interior surface of said inner ring and radially inwardly toward said center axis and annularly about said center axis into said at least one orifice to connect said inner ring to said bearing.

14. The latching assembly as set forth in claim 1 further including a retainer ring disposed adjacent said outer ring, attached to said lifting housing, and extending about said center axis to secure said outer ring to said lift housing.

15. A latching assembly for raising and lower a height of a vehicle, said latching assembly comprising:

a lift housing extending along a center axis between a first opened end and a second opened end and defining a chamber extending therebetween;

a support tube slidably disposed in said chamber extending about said center axis between a first end and a second end;

a moving member disposed between said support tube and said lift housing for moving said lift housing between an extended position and a lowered position;

said moving member including an inner ring and an outer ring with said inner ring extending about said support tube and said outer ring being attached to said lift housing for translating an axial movement of said support tube into a rotational movement to secure said lift housing in said extended position and allow said lift housing to move from said extended position to said lowered position;

a bearing disposed between an interior surface of said inner ring and said support tube with said bearing being rotatable about said support tube and attached to said inner ring to allow said inner ring to rotate about said support tube in response to an axial movement of said support tube; and a plurality of engagement members located between said inner ring and said outer ring for moving said inner ring and said outer ring axially along said center axis between said extended position and said lowered position.

16. The latching assembly as set forth in claim 15 wherein said engagement members including a plurality of inner ring teeth extending radially outwardly from an exterior surface of said inner ring, circumferentially spaced from one another, and along said center axis to an inner ring teeth end for engaging said outer ring.

17. The latching assembly as set forth in claim 16 wherein each of said inner ring teeth including a cam extending radially outwardly from said inner ring teeth and diagonally across said inner ring teeth at an oblique angle relative to said center axis.

18. The latching assembly as set forth in claim 17 wherein said engagement members further including a plurality of outer ring teeth, circumferentially spaced from one another, extending outwardly from an inner surface of said outer ring for engaging said inner ring teeth.

19. The latching assembly as set forth in claim 17 further including a plurality of pins extending radially inwardly toward said center axis for slidable engagement with said cam to rotate said inner ring about said support tube and allow said lift housing to move between said extended position and said lowered position.

20. The latching assembly as set forth in claim 19 wherein said plurality of pins includes a first set of pins, circumferentially spaced from one another, for engaging said cam; and
a second set of pins located radially and circumferentially spaced from said first set of pins for engaging said cam of said inner ring.

\* \* \* \* \*